Dec. 21, 1943. W. VAN B. ROBERTS 2,337,272
MODULATION
Filed March 10, 1939 4 Sheets-Sheet 1
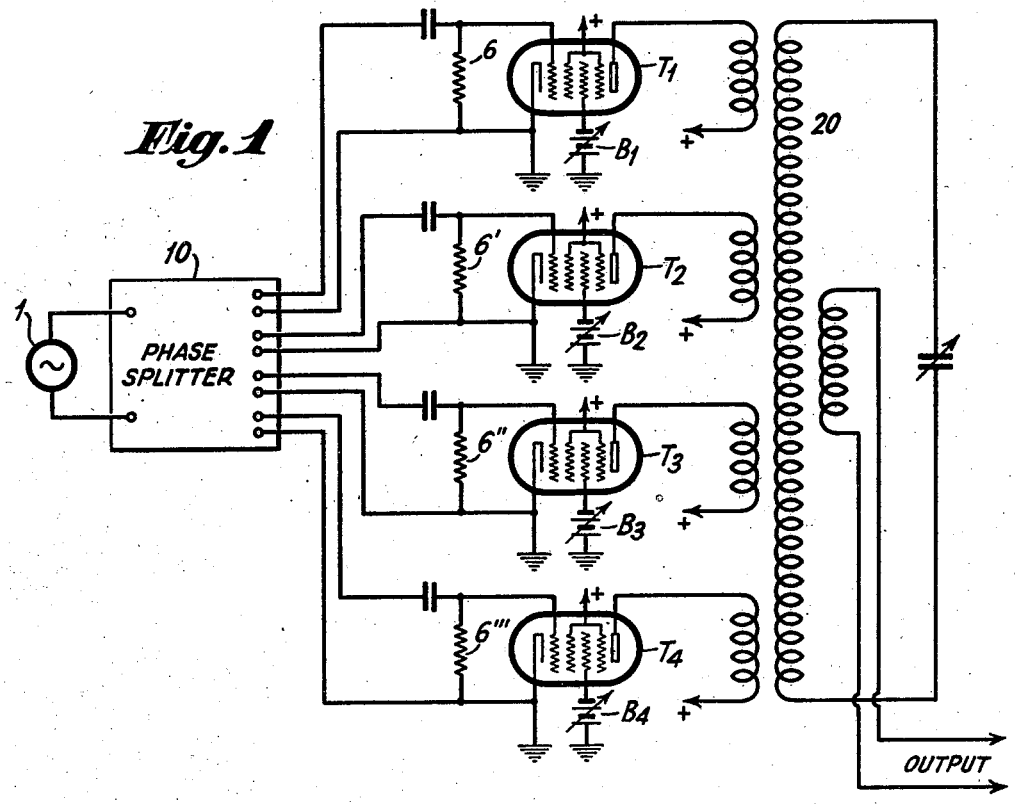
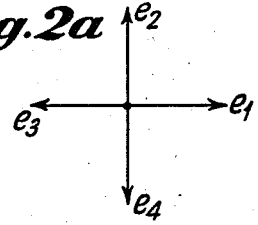
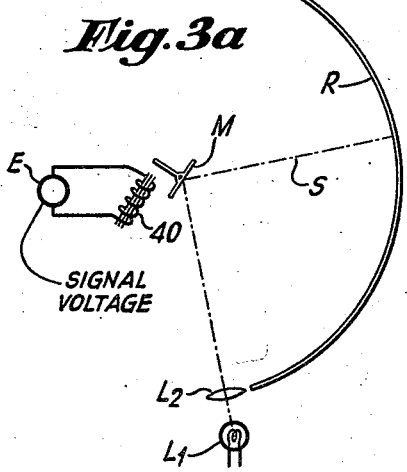
INVENTOR.
WALTER VAN B. ROBERTS
BY
ATTORNEY.

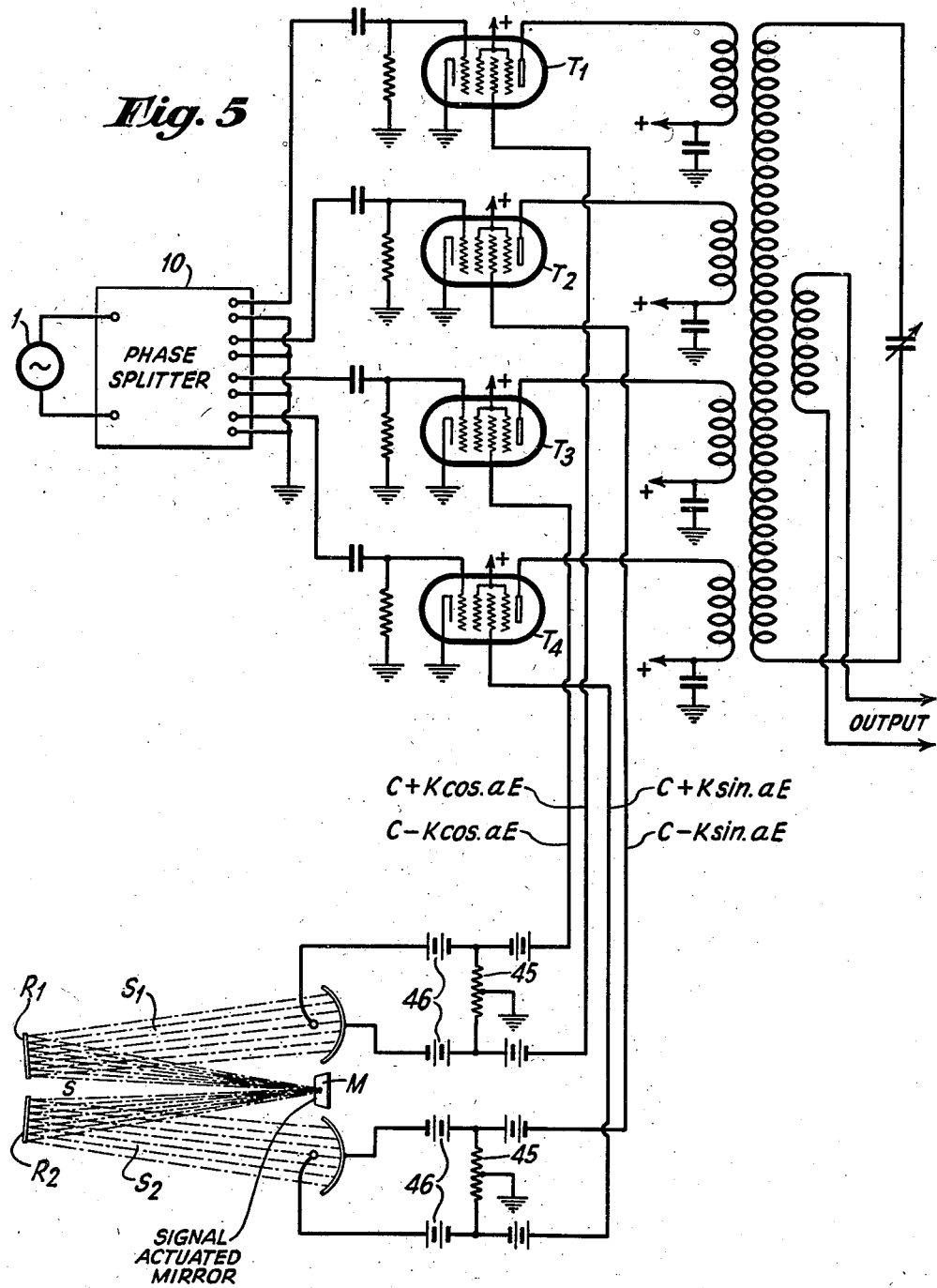

Patented Dec. 21, 1943

2,337,272

UNITED STATES PATENT OFFICE 2,337,272

MODULATION

Walter van B. Roberts, Princeton, N. J., assignor to Radio Corporation of America, a corporation of Delaware Application March 10, 1939, Serial No. 260,931

5 Claims. (Cl. 179—171.5)

The present invention relates to phase and frequency modulation generally but especially to a system for producing a large amount of such modulation.

An object of the invention is to provide means for advancing and retarding the phase of a high frequency current derived from a source of stable frequency, such as a crystal controlled oscillator, by relatively large angles in direct proportion to a signalling voltage.

A corollary object is to provide means for shifting the instantaneous frequency of the output of an amplifier by relatively large amounts proportional to a signalling voltage, said amplifier input being excited by a source of constant frequency voltage.

The particular object is to provide an arrangement capable of phase modulating a carrier wave to a relatively great phase deviation without introducing undesired amplitude modulation, thereby eliminating the necessity for limiting devices or the like subsequent to modulation.

A further object is to provide a phase modulating system which introduces the same phase deviation regardless of the frequency of the carrier wave, whereby ultra-high frequency waves may be directly phase-modulated without the necessity for utilizing subsequent frequency multipliers either to increase the frequency or to increase the amount of phase swing produced by the modulation.

An incidental object of the invention is to provide a means for developing, from a given arbitrarily varying current or voltage, an output current or voltage proportional to a harmonic function of the product of said given voltage and a constant quantity.

A related incidental object is to produce, from a given current or voltage, two currents or voltages each of which is proportional to a harmonic function of the product of said given voltage or current and a constant quantity, said two harmonic functions being phase displaced relatively to each other by a constant amount.

Referring to the drawings:

Figure 1 shows an arrangement known in the art for phase adjustment.

Figures 2a and 2b are vector diagrams illustrating the operation of Figure 1.

Figures 3a, 3b and 3c illustrate one form of a device arranged in accordance with the present invention for producing potentials or voltages proportional to a harmonic function of a signal voltage for controlling the phase of the output of the arrangement shown in Figure 1.

Figure 5 shows how the controlling voltages produced by the means 3a, 3b and 3c are applied to the system of Figure 1.

Figures 6a, 6b and 6c show an alternative means for producing the controlling voltages while

Figure 3B:
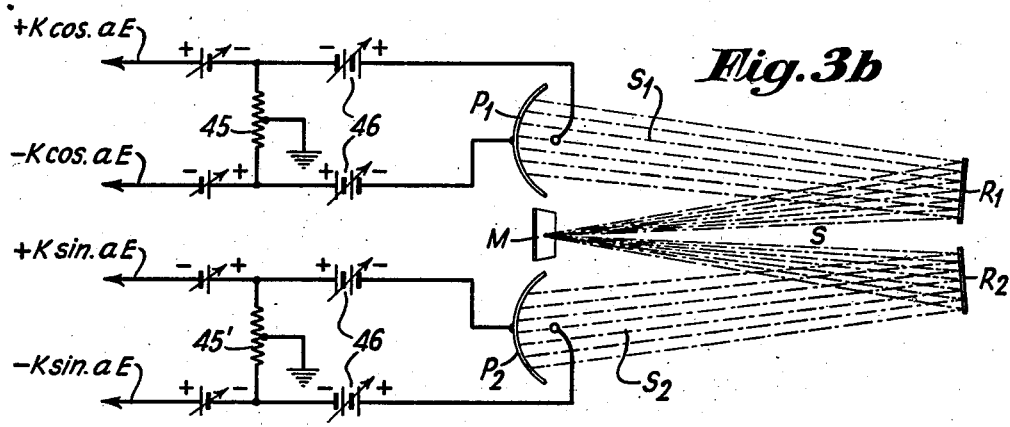

Referring specifically to Figure 1, there is shown an arrangement of the type disclosed in Peterson's U. S. application Serial #236,027, filed October 20, 1938, for adjusting the phase of the output of an amplifier. Its operation is briefly as follows:

A source of constant frequency voltage 1 impresses a voltage upon a phase splitter 10 to produce a four phase output, as illustrated vectorially in Figure 2a. Each of these four voltages is impressed upon an amplifying tube input circuit. That is, the four phases are impressed on the input impedances 6, 6', 6'' and 6''' of four tubes $T_1$, $T_2$, $T_3$ and $T_4$ as shown. The amplification of each tube is arranged to be controlled by an adjustable voltage indicated at B1, B2, B3, B4. These voltages may be applied in any appropriate manner. For example, they may be applied to grid electrodes as shown. Let us assume that the horizontal vector $e_1$ extending to the right in Figure 2a represents the high frequency voltage applied to tube $T_1$ and let us assume that voltages B2, B3 and B4 are adjusted to reduce the amplification of tubes $T_2$, $T_3$ and $T_4$ to zero. In this case the current induced in the tank circuit 20 may be represented by the horizontal solid arrow of Figure 2b. High frequency voltages represented in Figure 2a by vectors $e_2$, $e_3$ and $e_4$ are also applied to the inputs 6', 6'' and 6''' of tubes $T_2$, $T_3$ and $T_4$. Now suppose that the voltage B2 be altered to permit tube $T_2$ to amplify somewhat. The resultant voltage in tank 20 will then have its phase shifted so as to lie in the direction indicated by vector 3 of Figure 2b. If at the same time the amplification of tube $T_1$ is suitably reduced, the resultant will be unaltered in magnitude. In like manner by suitable relative proportioning of voltages B1 and B2 the tank circuit high frequency voltage may be kept constant in magnitude but have its phase varied throughout the quadrant containing the vectors shown in Figure 2b. In general, it will thus be seen that if the amplification of any two tubes is kept at zero, a suitable variation of the relative amplifications of the two active tubes will result in swinging the output voltage through one quadrant and hence that the phase of the voltage in tank circuit 20 may be adjusted to any desired value by impressing the proper combination of voltages B1, B2, B3, B4 upon the amplification control electrodes of tubes $T_1$, $T_2$, $T_3$, $T_4$.

In the foregoing it was assumed that the potentials B1, B2, B3 and B4 were separately and manually adjusted. In accordance with the present invention, however, improved means are provided for varying these potentials simultaneously in accordance with the signaling voltage, the relation between the various potentials being maintained such that the resultant high frequency voltage induced in tank circuit 20 is of unvarying magnitude but has a phase angle that is proportional to the signalling voltage. It can be shown that this condition will be attained if the amplifications of the four tubes are sinusoidal functions of a quantity proportional to the signalling voltage, these sinusoidal functions being related to each other in phase exactly like the vectors shown in Figure 2a. To be specific (and assuming for the moment that the amplifications of the tubes are linearly dependent upon their amplification control voltages), the desired control is obtained if the four amplification control voltages B1, B2, B3 and B4 are of the form $C+K \cos aE$, $C+K \sin aE$, $C-K \cos aE$, and $C-K \sin aE$, respectively, where $K$ and $a$ are constant quantities, $E$ is the instantaneous value of the signalling voltage, and $c$ is the initial bias on the amplification control electrode of each tube, this bias being preferably chosen to reduce the output of the tube to substantially zero in the absence of any superposed voltage derived from the signal.

Figure 4:
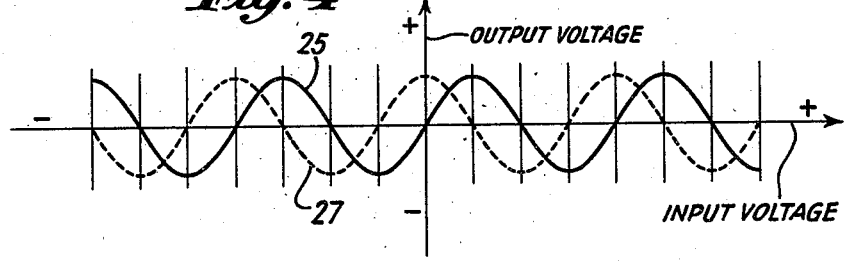
Figure 4 shows how the output of the device of Figures 3a, 3b and 3c varies with its input.

Figure 4 shows how the portion of the amplification control voltage which depends upon the signal voltage is varied with the signal voltage. The solid line 26 indicates the sine wave variation while the dotted line 27 shows the cosine function. It will be understood that the curves of Figure 4 extend as far to the right and left as necessary to include the maximum value of signal voltage employed. That is the number of sinusoidal alternations is a function of the input voltages. It will be seen from Figure 4 that if the tubes are normally biased to zero output, the control voltage corresponding to zero signal input will be such that only tube T1 is active. As the signal voltage increases the amplification of tube T1 decreases, while that of tube T2 increases and the phase of the resultant voltage in tank circuit 20 rotates. When the input voltage is increased to a value corresponding to one complete cycle of the output voltage shown in Figure 4, the phase of the voltage in tank circuit 20 has rotated one complete turn. As the input voltage continues to increase, the phase continues to rotate and the total amount of rotation will thus be proportional to the instantaneous value of the input voltage. Obviously a large number of rotations of the phase of output is possible, the number being limited only by the number of sinusoidal alterations produced by the voltage E. The phase displacement at any instant is equal to $aE$ radians. In a similar manner it may be shown that for negative values of input voltage the phase is rotated $aE$ radians in the opposite sense. This can be seen by following through the effects of the curves of Figure 4 to the left side of the vertical axis.

As was noted above, the sinusoidal function shown in Figure 4 represents the required dependency of amplification control voltage upon signal voltage only in case the amplification of the tubes varies linearly with the amplification control voltage. If this linear relation is not accurately true it is, however, only necessary to alter the voltage curve shapes of Figure 4 sufficiently so that the resulting amplification will be a sinusoidal function of the signal voltage. Otherwise although the phase will be displaced in accordance with the signal voltage the amplitude will not remain entirely constant.

I have now shown how the phase of the voltage induced in tank 20 of Figure 1 may be adjusted to any desired value and I have shown how the amplification of the various tubes must vary with signalling voltage in order that this phase displacement should be proportional to the signalling voltage while the amplitude remains constant.

Figure 3C:
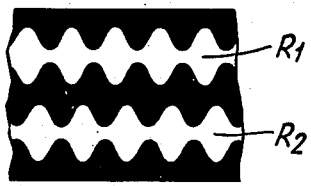

In Figures 3a, 3b and 3c there is shown a means for obtaining for the purpose of phase adjustment or control the four sinusoidal voltages required and illustrated in Figure 4. Figure 3a shows a source of light L1, and an optical system L2 arranged to produce a thin sheet of light S. The plane of this sheet of light is perpendicular to the plane of the drawings. This sheet of light S is directed upon a mirror M and therefrom reflected to a reflecting surface R which is part of a figure of revolution. The angular position of mirror M is determined by the signal voltage E applied to the coil 40 of a magnetic drive arrangement. As the signal voltage varies the reflected sheet of light S sweeps along the reflecting surface R. Figure 3b shows at R1 and R2 a vertical section through reflecting surface R. The two portions of the reflecting surface R1 and R2 are at a slight angle with each other so that the sheet of light S from the mirror M is separated into two portions S1 and S2 which impinge upon separate photoelectric cells P1 and P2. Figure 3c shows an elevation of the reflecting surfaces R1R2, the black portion being non-reflecting and the white portion reflecting. It will be seen that as a narrow sheet of light travels along the surfaces of Figure 3c, the amount of light reflected from each portion will vary sinusoidally with the displacement of the light beam but there is a difference of 90° in the phase of this variation of the reflected light from the two surfaces R1R2. If the position of rest of the light beam is suitably chosen, the output of photocell P1 will then be proportional to $K$ cosin $aE$ or minus $K$ cosin $aE$ according to which end of the output resistance 45 it is connected to while the output of photo-cell P2 derived from resistance 45' gives a voltage $K \sin aE$ or minus $K \sin aE$. It is assumed that the batteries 46 are so adjusted as to eliminate any undesired constant voltages from the output.

In order to obtain a large amount of phase modulation, it is only necessary to arrange that the signalling voltage E shall cause the beam of light S to pass over a large number of the variations in the reflecting surfaces of Figure 3c since it will be remembered that each variation passed over corresponds to a full 360° phase rotation in the high frequency output at 20.

Figure 6A:
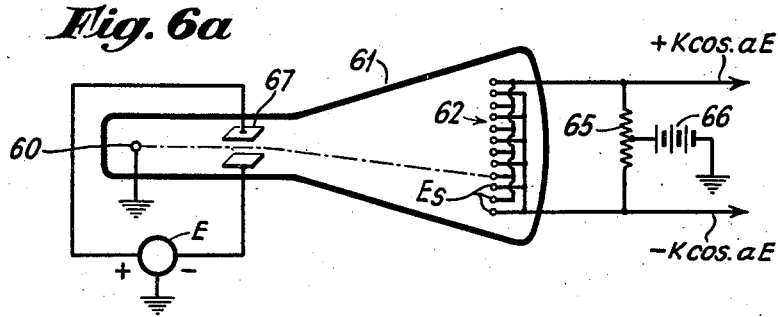
Figure 6B:
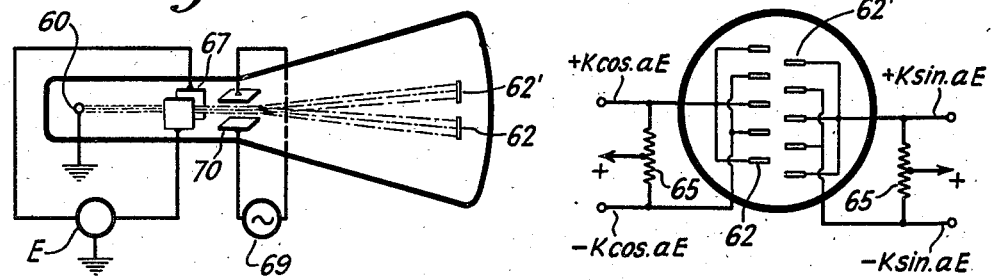

Figure 5 shows the arrangement of Figures 3a, 3b and 3c connected to the phase adjusting device of Figure 1 to form a complete phase modulating system. It is not believed that further explanation of the operation of the system is necessary in view of the foregoing description of the operation of each part thereof. Figure 6a shows an arrangement for producing control voltage variations of the type shown in Figure 4 which may be used in place of the arrangement shown in Figure 3. In Figure 6a a cathode ray producing means of any type shown for simplicity as a ray producing means 60 in an envelope 61 having a target 62 is used to produce the sinusoidal voltages from the signal voltages E. The target comprises electrodes ES alternate ones of which are tied together and connected to the resistance 65 the electrical center of which is connected to the necessary positive potential source 66 to operate the electron ray tube. The source E acts through the deflecting plates 67 to move the electron stream up and down the target interleaved electrodes ES so as to produce opposite phase variations of output representing by $\pm K \cos aE$ where $a$ depends on the spacing of electrodes ES and on the deflecting sensitivity of the gun, while K depends on the beam density, the anode elements and the output resistances. To obtain the other voltages represented by $+K \sin aE$ a second set of interleaved elements ES are mounted placed alongside of the ones shown so that the beam or ray produced and deflected by 67 divides itself between and falls on the two targets. These target systems may be arranged so that when viewed from above in Figure 6a they are related as indicated at 62 and 62' in Figure 6b. The electron beam may be narrow and may be deflected across the two sets of interleaved electrodes 62, 62' by voltages from a source 69 acting on deflecting plates 70. The beam now is moved up and down by the signal voltage E along the targets 62 and 62' and is also deflected across said targets, to fall on both sets, by a super-audible voltage from 69, which may be filtered out of the output. Furthermore, the systems 62, 62' are displaced by one-half the adjacent element spacing so that the variations of current in these two systems are 90° out of phase with each other. Thus the outputs of 62 are $\pm K \cos aE$ while the outputs of 62' are $\pm K \sin aE$ which is the result desired.

Figure 6C:
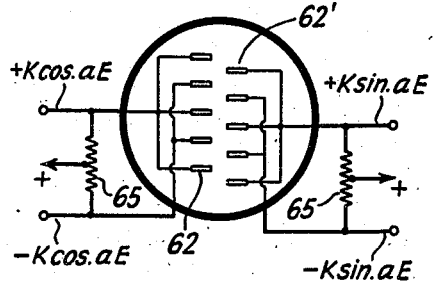

The dimensions of 62, 62' are made only great enough to accommodate the maximum beam swing employed. A view of the electrode systems 62 and 62' from a point at the cathode 60 is given in Figure 6c.

Figure 7:
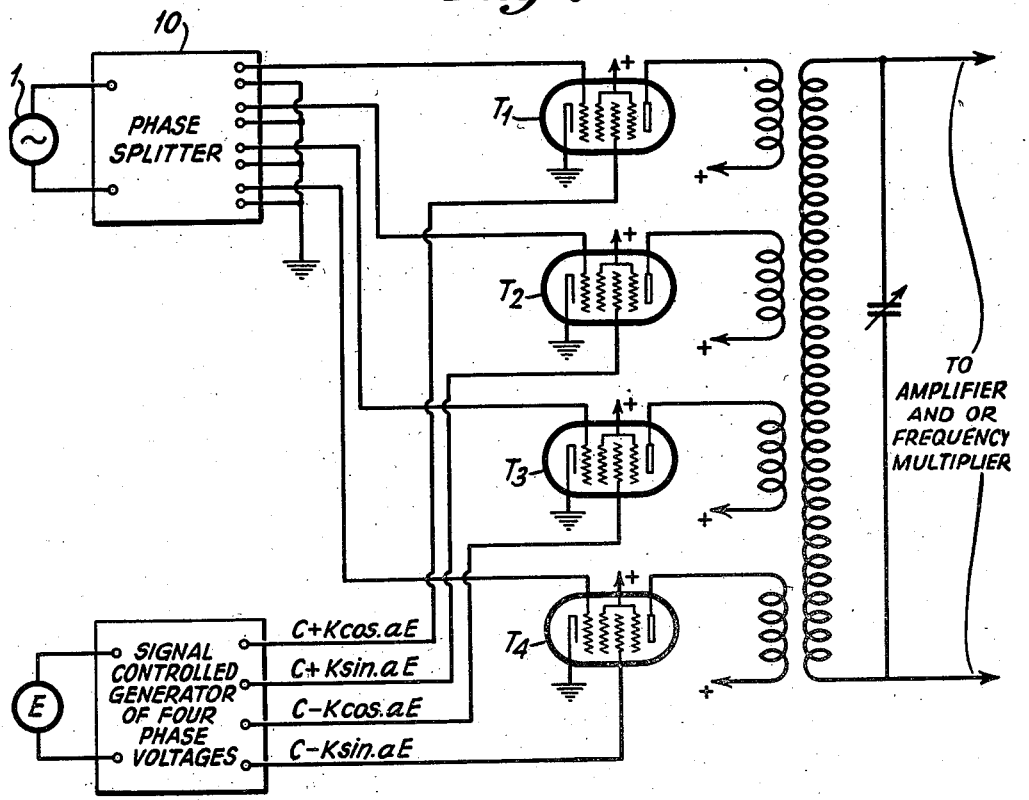
Figure 7 shows a complete modulator system arranged in accordance with my invention.

In Figure 7 I have shown a complete modulation system arranged in accordance with my invention. In this diagram the controlling voltage means is shown diagrammatically. Any means for producing these voltages may be used. The circuit is believed self-explanatory to one who has read the detailed description of the preceding figures.

While I have described my invention with particular reference to phase modulation, it will be understood that by suitably altering the wave form of a signalling voltage and phase modulating the transmitter in accordance with this altered wave form, the output is the same as if the original signal had been used to frequency modulate a carrier wave. This use of a phase modulating system to stimulate the results of frequency modulation is well known in itself, however, and forms no part of the invention. It will, therefore, merely be noted that the effective frequency modulation obtained by this method has a frequency deviation which is strictly proportional to the signalling voltage and is free of amplitude modulation, while the amount of frequency deviation may be made very large without recourse to frequency multiplication. It should also be pointed out that since the original carrier source may be of an extremely stable frequency, the carrier component of the frequency modulated wave in the present method remains constant to a high degree.

Having thus described my invention, what I claim is:

1. Means for varying, in accordance with a signal voltage, the phase of current in a common load circuit fed by four amplifiers operating in quadrature phase relation which comprises means for producing from said signal voltage four voltages each varying as a harmonic function of said signalling voltage and having 90° phase displacement between each adjacent pair of voltages and means for controlling the amplification of each of said amplifiers in accordance with one of said harmonic voltages.

2. In a modulation system, means for producing a plurality of voltages of like frequency displaced in phase progressively by like amounts, separate means for supplying each of said voltages to a common circuit, means for producing a like number of voltages each of which varies sinusoidally with respect to a signalling voltage the phases of which are progressively displaced by like amounts, and means for controlling the amplitude of the first named voltages as supplied to said common circuit in accordance with the latter voltages.

3. The method of modulation which includes, generating a carrier wave, splitting the phase of said carrier to form a plurality of waves of different uniformly separated phases, separately amplifying each of said waves of different phases, generating a plurality of auxiliary voltages each defined by the expression $C+K \sin (aE+\varphi)$ where C, K, and $a$ are constants determining respectively the said component of bias on each amplifier, the amplitude of variation of said bias, and the amount of signal voltage required to produce a given phase shift in said auxiliary voltage, E is a signalling voltage, and $\varphi$ is a phase constant which has a different value for each of said auxiliary voltages and $a$ is sufficiently great to make $aE$ large compared to $2\pi$, controlling the amplification of each of said plurality of waves in accordance with a different one of said auxiliary voltages, and combining said amplified waves to form a resultant wave whose phase is rotated in proportion to E an amount which is large compared to $2\pi$.

4. In a modulation system, a phase splitter for producing a plurality of voltages of like frequency, each voltage being displaced in phase from the closest adjacent voltages by like amounts, an amplifier for supplying each of said voltages to a common output circuit, apparatus for producing a like number of voltages, each of which varies sinusoidally with respect to a signalling voltage, the phase of each of said last named voltages being displaced from the closest adjacent voltages by like amounts, and connections for controlling the amplitude of the first named voltages as supplied to said common circuit in accordance with the last named voltages.

5. In a modulation system, connections for producing a plurality of voltages of like frequency, each voltage being displaced in phase from the closest adjacent voltages by like amounts, a common circuit, a separate class B amplifier excited by each of said voltages for supplying each of said voltages to said common circuit, there being a class B amplifier for each voltage, apparatus for producing a like number of voltages, each of which varies sinusoidally with respect to a signalling voltage, the phase of each of which is displaced from the phases of the closest adjacent voltages by like amounts, and connections for controlling the gain of each of the class B amplifiers in accordance with a different one of said last mentioned voltages.

WALTER VAN B. ROBERTS.